United States Patent [19]

Talbot et al.

[11] Patent Number: 4,671,521
[45] Date of Patent: Jun. 9, 1987

[54] SNOWMOBILE SKI SUSPENSION

[75] Inventors: Jean-Guy Talbot, Valcourt; Andre M. Gauthier, St-Théodore d'Acton, both of Canada

[73] Assignee: Bombardier Inc., Montreal, Canada

[21] Appl. No.: 706,185

[22] Filed: Feb. 27, 1985

[51] Int. Cl.⁴ .............................................. B62B 13/08
[52] U.S. Cl. .................... 280/16; 280/21 R; 280/95 R; 280/666; 180/190
[58] Field of Search .................. 280/21 R, 21 A, 16, 280/696, 666, 667, 95 R; 180/190

[56] References Cited

U.S. PATENT DOCUMENTS

| | | | |
|---|---|---|---|
| 3,777,830 | 12/1973 | Christensen | 280/21 A |
| 3,884,314 | 5/1975 | Callaway | 280/21 R |
| 3,967,692 | 7/1976 | Hoffman | 280/21 A |
| 4,277,078 | 7/1981 | Root | 280/95 R |
| 4,337,958 | 7/1982 | Witt | 280/16 |
| 4,348,033 | 9/1982 | Stevens | 280/16 |

OTHER PUBLICATIONS

McLaren M19, copyright Anglia Art, received at Patent Office May 1981.
*Racing Car Design*, Terry & Baker, Copyright 1973, pp. 153-157.

*Primary Examiner*—David M. Mitchell
*Attorney, Agent, or Firm*—Larson and Taylor

[57] ABSTRACT

In a snowmobile ski suspension each ski is steerable within a bearing support which is connected in the snowmobile on parallelogram suspension linkage means having upper and lower transverse suspension arms pivotally attached to the bearing support. A strut has a lower end pivoted on the lower suspension arm and extends upwardly to act upon a hydraulic damper through a crank lever.

8 Claims, 5 Drawing Figures

SNOWMOBILE SKI SUSPENSION

FIELD OF INVENTION

This invention relates to a new or improved arrangement for the suspension of the skis of a snowmobile.

DESCRIPTION OF THE PRIOR ART

In the past there have been numerous proposals to provide ski suspensions in snowmobiles. The most common arrangement involved the provision of a multi layered leaf spring the ends of which were attached to the snowmobile ski and the central portion of which was attached to an upwardly extending ski leg pivotally mounted in the snowmobile. Suspension movement was effected by deflection of the leaf spring in response to loads imposed upon the ski. Ski suspensions of this type were not entirely satisfactory and were very limited in the amount of deflection that could be accommodated. An alternative prior art proposal involved the incorporation of a telescopic hydraulic damper arrangement and spring directly in the upright leg of a snowmobile ski. This arrangement was not successful in practice and was costly to produce and difficult to accommodate in the snowmobile design.

SUMMARY OF THE INVENTION

The present invention provides a snowmobile ski suspension comprising a pair of steerable skis supporting the front end of the snowmobile, each ski being pivotally attached on a horizontal axis transverse to its length to the lower end of a generally upright ski leg, said ski leg being mounted to be rotatable about its longitudinal axis in a respective bearing support, and suspension linkage means connecting said bearing support to the snowmobile and comprising: an upper and a lower transverse suspension arm vertically spaced and each having an outboard end articulated to said bearing support and an inboard end articulated to a fixed mounting on a frame of the snowmobile and defining a parallelogram linkage for guiding said bearing support to move generally vertically with respect to the snowmobile; and yieldable suspension spring and damper means operatively associated with each ski to urge it downwardly to support the weight of the snowmobile thereon and dampen vertical movement thereof, wherein said suspension spring and damper means has one end anchored to a fixed mounting on the frame of the snowmobile and the opposite end connected to a lever system comprising a crank lever having one arm pivoted to said opposite end, a second arm pivoted to one end of a strut and an intermediate portion pivoted on a fixed mounting on the snowmobile frame, said strut extending generally downwardly to a second end which is pivotally connected to the respective lower transverse suspension arm.

Preferably the suspension includes on each side of the snowmobile an elongate longitudinally extending control arm fixedly attached to the respective bearing supports, extending rearwardly therefrom and having a rear end pivotally mounted on a fixed transverse horizontal axis in the snowmobile. This control arm is effective to support the ski suspension against unwanted deflections in the fore-and-aft direction without however substantially impairing or interferring with the normal vertical deflections that are encountered in operation.

DESCRIPTION OF THE FIGURES OF DRAWINGS

The invention will further be described, by way of example only, with reference to the embodiment illustrated in the accompanying drawings wherein.

DESCRIPTION OF THE PREFERRED EMBODIMENT

Figure 1:
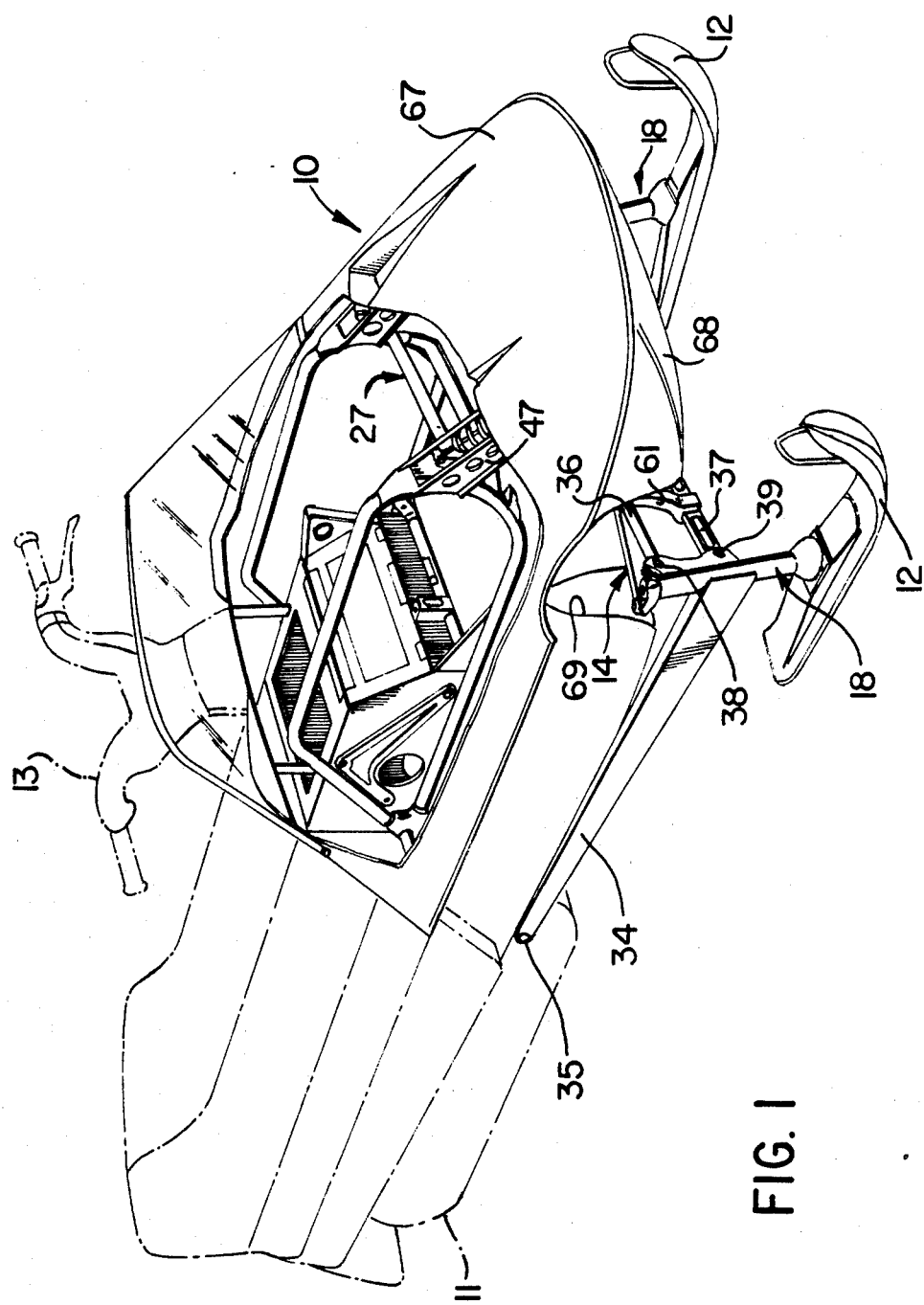
FIG. 1 is a somewhat schematic perspective view of a snowmobile incorporating a ski suspension in accordance with this invention.

Referring to FIG. 1, a snowmobile 10 has a rear end supported upon a driven track shown in outline at 11, and a front end supported upon a pair of skis 12 controllable by the snowmobile operator through handle bars 13 that are connected to the skis through a steering linkage 14.

Figure 4:
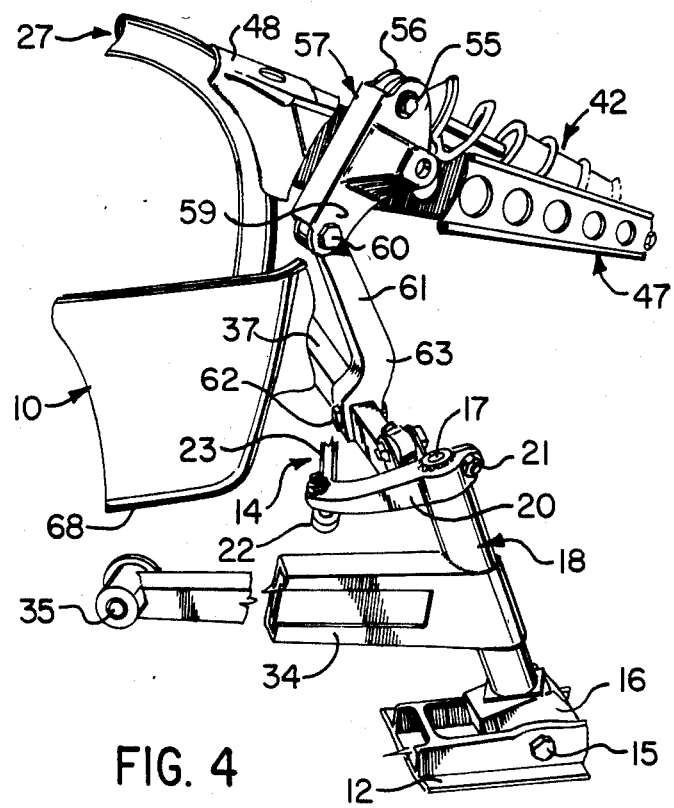
FIG. 4 is a side perspective view with parts omitted showing details of the suspension.

Referring to FIG. 4, each ski 12 is pivotally attached by a bolt 15 to a block 16 carried on the lower end of a cylindrical ski leg 17. As will be appreciated, the ski 12 can pivot about the axis of the bolt 16 to accommodate to undulations in the terrain over which the snowmobile travels, the range of this pivotal movement being controlled in normal manner by resilient buffers (not shown) or the like arranged between the block 16 and the ski. The ski leg 17 is rotatably received within a tubular bearing support 18 and extends in a generally upright direction. The lower end of the bearing support 18 has a flange 19 which bears upon the upper surface of the block 16. The upper end of the ski leg 17 projects above the bearing support 18 and is engaged by one end of a steering arm 20. To improve this engagement, the steering arm may be formed with a splined clevis engaging a matching splined end section of the ski leg and secured thereto by a clamping fastener 21.

Figure 5:
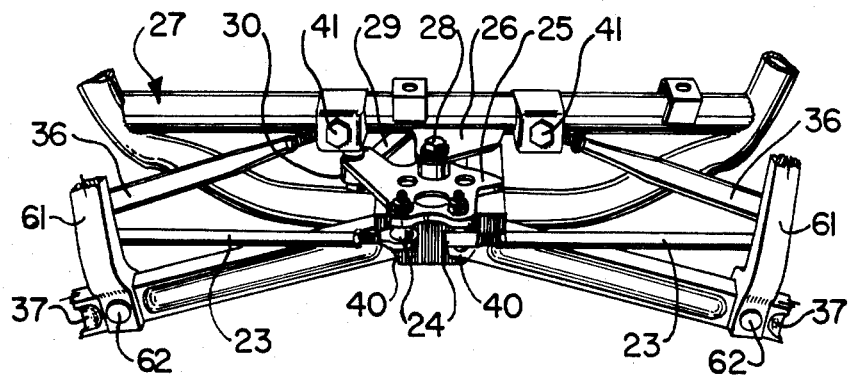
FIG. 5 is a front perspective fragmentary view showing details of the suspension.

The distal end of the arm 20 forms a swivel connection 22 to the outboard end of a steering linkage rod 23. As best seen in FIG. 5, the inboard ends of the steering linkage rods 23 are coupled to swivel connections 24 on a steering control plate 25. The plate 25 is attached to a lug 26 on the frame structure 27 of the snowmobile by a pivot mount 28, the plate 25 being capable of pivotal movement on a vertical axis about the mount 28. Pivotal movement of the plate 25 is controlled by a steering drive rod 29 coupled to an arm of the plate on a swivel connection 30 and connected at its other end through conventional means (not shown) to the handle bars 13 to transmit movements thereof through the steering linkage. As will be evident, longitudinal movement of the steering drive rod 29 as a result of movement of the handle bars 13 is converted into pivotal movement of the steering control plate 25, and this movement is in turn imparted to each ski through the respective steering linkage rod 23, steering arm 20 and ski leg 17.

Each ski 12 is suspended for generally vertical displacement with respect to the snowmobile 10 during operation, and the suspension means in each case includes a rearwardly directed elongate control arm 34 which is integral with the bearing support 18 and extends generally horizontally, being tapered towards its rear end where it forms a pivotal attachment 35 on a horizontal axis to the side of the snowmobile. The control arm thus secures the ski bearing support 18 against displacement in the fore-and-aft direction without restricting its freedom to move vertically to accommodate load induced deflections. In such deflections the bearing support 18 moves in an arcuate path with respect to the pivotal attachment 35, but because of the very great length of the control arm 34, the displacement of the support 18 in the fore-and-aft direction during such deflections is insignificant.

Each ski suspension also includes an upper suspension arm 36 and a lower suspension arm 37 which extend in a transverse vertical plane and form a parallelogram suspension linkage. As seen in FIG. 1, the outboard ends of these suspension arms form pivotal attachments 38 and 39 respectively with the ski leg bearing support 18. The inboard end of the lower suspension arm forms a pivotal connection 40 to the snowmobile frame 27 close to the central plane of the vehicle whereas the inboard end of each upper suspension arm 36 forms a pivotal connection 41 to the frame 27 in a laterally displaced location as seen in FIG. 5. It will be appreciated that from the geometry of the linkage formed by the upper and lower suspension arms and their points of attachment to the snowmobile frame 27 and the ski leg bearing support 18, the latter will be constrained to remain in a substantially vertical attitude during vertical displacement of the ski in operation. Such vertical displacement movement of each ski is controlled by a hydraulic damper unit 42 which in known manner incorporates a coiled suspension spring 43 and a telescopic damper 44 (see FIG. 2). Each damper unit 42 is mounted between the opposed walls 45, 46 of a hollow strut 47. The strut 47 has a rear end formed as a bracket 48 that is welded to a side member of the frame 27. The strut 47 tapers downwardly and forwardly to a front end 49 that is welded to one end of a cross tube 50 of the snowmobile frame.

Figure 2:
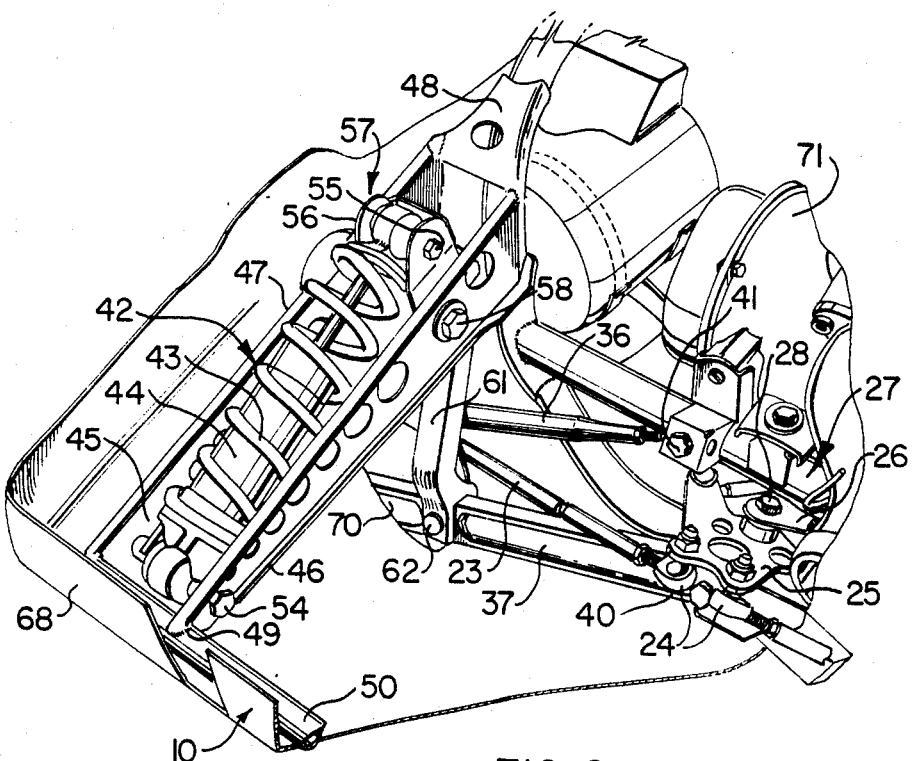
FIG. 2 is an enlarged fragmentary perspective view of a part of the suspension linkage.
Figure 3:
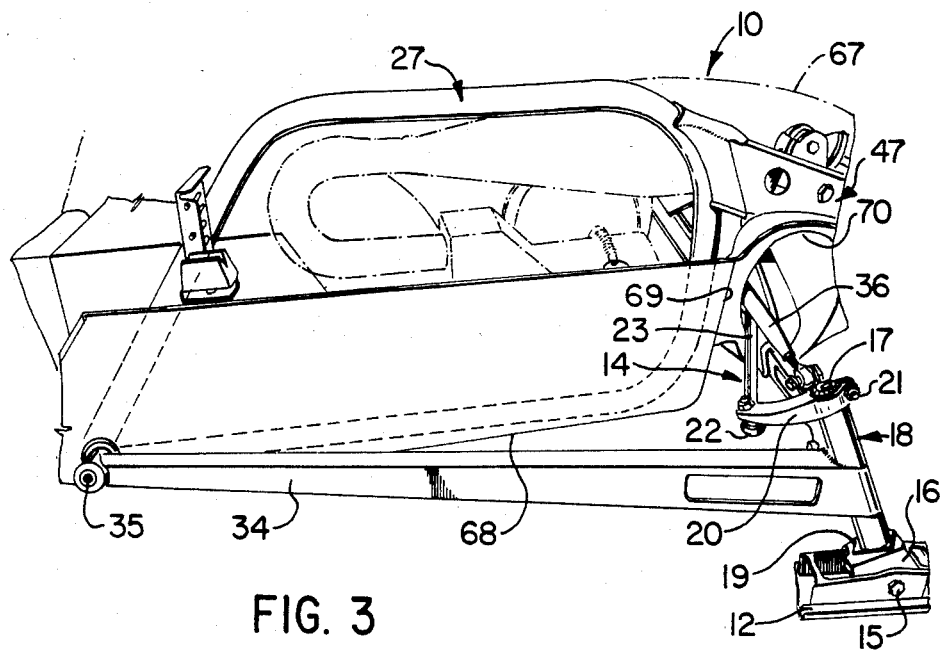
FIG. 3 is a fragmentary side view showing a portion of the forward part of the snowmobile and relevant elements of the ski suspension linkage.

The front end of the damper unit 42 is pivotally attached to a pin 54 that is mounted between the walls 45 and 46 of the strut 47. The rear end of the damper unit 42 is pivotally attached by a pin 55 to the upper arm 56 of a cranked bracket 57 that is pivotally mounted on a pin 58 carried by the side walls 45, 46 of the strut 47 as shown in FIG. 2. In FIG. 4 part of the strut 47 is omitted to show more clearly the form of the bracket 57. As seen in this Figure, the bracket 57 has a lower arm 59 which carries a pin 60 forming a pivotal connection with the upper end of a generally vertically arranged suspension strut 61. The lower end of the strut 61 is pivotally attached on a pin 62 to the lower suspension arm 37. As clearly seen in FIGS. 2 and 4, the suspension strut 61 has an offset forwardly curved intermediate portion 63 to provide clearance between the strut 61 and the upper suspension arm 36. In FIG. 4 the upper suspension arm 36 has been omitted for reasons of clarity.

It will be evident from the configuration of the parts as shown in the drawings that vertical displacement of the ski 12 will be transmitted through the lower suspension arm 37, the suspension strut 61 and the bracket 57 to the damper unit 42, this movement being accommodated by pivoting of the various elements about the pins 62, 60, 58 and 55. As will be evident from FIG. 4, upwards deflection of the ski 12 will result in clockwise rotation of the bracket 57 and compression of the damper unit 42. The characteristics of the suspension are of course governed by the arrangement and geometry of the different elements, and in particular of the bracket 57, the relative lengths of the arms 56 and 59 of the bracket, the angular relationship of these arms, and the orientation of the bracket relative to the damper unit 42. These factors govern the relationship between the movement of the pin 55 towards and away from the pin 54 (and hence the compression or extension of the damper unit 42) in response to vertical deflections of the ski 12. The suspension characteristic is chosen to be such that with increasing upwards deflection of the ski 12 from the "neutral" position shown in FIG. 4, the ratio between the displacement of the ski and the compression of the damper unit gradually increases to provide what is known as a "rising rate" suspension. By the "neutral" position, it is intended to mean the position assumed by the ski when supporting only the weight of the snowmobile and its operator. The suspension characteristic can easily be changed by replacing the damper unit 42 and/or the cranked bracket 57 by ones having different characteristics. As will be evident particularly from FIG. 1, these components are in a readily accessible position in the front forward part of the snowmobile and access to them can be gained simply by swinging back the snowmobile cab 67 which conventionally is pivoted about its forward edge.

The lower side of the snowmobile is closed by a pan structure 68 of suitable sheet material and formed in the vicinity of each ski leg with a large recess 69 to accommodate all permissible movements of the suspension and steerage mechanism. In each recess 69 is formed a large aperture 70 (see particularly FIG. 2) through which the suspension and steering linkages pass to the interior of the snowmobile. This aperture 70 is typically sealed by a large elastic boot or grommet (not shown) to prevent entry of snow or other substances to the interior of the snowmobile.

As seen in FIG. 2, the snowmobile engine 71 is mounted essentially to the rear of the suspension within the frame structure 27. Since none of the suspension elements are positioned beneath the engine, this makes it possible to lower the position of the engine so that the profile of the snowmobile can be made correspondingly lower.

The ski suspension illustrated and described above is less costly to produce than many prior art suspensions yet offers very significant advantages in terms of ease of adjustment and replacement of parts. Depending upon the particular configuration of the crank lever 37, the suspension can accommodate up to about 6.5 inches of vertical travel of the ski, and this in turn contributes to the handling and comfort of the vehicle.

The improved ski suspension described above and in the darwings provides a "progressive rate" of spring suspension. In contrast to prior linear rate suspension in which for each inch of compression, the same amount of force was required, in a progressive rate system the force required for successive increments of compression increases. The linkage arrangement by which the ski deflections are applied to the damper unit 42 and in particular the arrangement of the cranked bracket or lever 57, in effect varies the lever ratio of the ski deflection with respect to the damper unit. Thus the suspension can absorb progressively more force without "bottoming out" and provides a progressive rate or rising rate suspension arrangement. In contrast to prior linear rate suspension systems, in which the spring would compress by a uniform amount for each inch of travel, in the described progressive rate system the damper unit compresses more easily initially, but becomes more difficult to compress as the ski deflection increases.

We claim:

1. A snowmobile ski suspension comprising a pair of steerable skis supporting the front end of the snowmobile, each ski being pivotally attached on a horizontal axis transverse to its length to the lower end of a generally upright ski leg, said ski leg being mounted to be rotatable about its longitudinal axis in a respective bearing support, and suspension linkage means connecting said bearing support to the snowmobile and comprising:

an upper and a lower transverse suspension arm vertically spaced and each having an outboard end articulated to said bearing support and an inboard end articulated to a fixed mounting on a frame of the snowmobile and defining a parallelogram linkage for guiding said bearing support to move generally vertically with respect to the snowmobile; and yieldable suspension spring and damper means operatively associated with each ski to urge it downwardly to support the weight of the snowmobile thereon and dampen vertical movement thereof, said suspension spring and damper means having one end anchored to a fixed mounting on the frame of the snowmobile and the opposite end connected to a lever system comprising a crank lever having one arm pivoted to said opposite end, a second arm pivoted to one end of a strut and an intermediate portion pivoted on a fixed mounting on the snowmobile frame, said strut extending generally downwardly to a second end which is pivotally connected to the respective lower transverse suspension arm and wherein said suspension spring and damper means is mounted above and forwardly of the associated lever system and slopes upwardly from said one end to said opposite end thereof.

2. A suspension according to claim 1 wherein each ski leg has an upper end which extends above the respective bearing support and is coupled to a generally radially extending steering arm which has a distal end that is articulated to a steering rod coupled to the steering mechanism of the snowmobile.

3. A suspension according to claim 2 wherein the inboard end of each steering rod is articulated to a steering control plate which is horizontally arranged to pivot about a vertical mounting axis on the snowmobile frame.

4. A suspension according to claim 1 wherein the dimensions and the spatial arrangement of the suspension arms, the strut, the crank lever and the suspension spring and damper means is such that the resistance to compression of said suspension spring and damper means increases exponentially as the ski suspension is deflected progressively upwards from its normal position.

5. A snowmobile ski suspension comprising a pair of steerable skis supporting the front end of the snowmobile, each ski being pivotally attached on a horizontal axis transverse to its length to the lower end of a generally upright ski leg, said ski leg being mounted to be rotatable about its longitudinal axis in a respective bearing support, and suspension linkage means connecting said bearing support to the snowmobile and comprising:

an upper and a lower transverse suspension arm vertically spaced and each having an outboard end articulated to said bearing support and an inboard end articulated to a fixed mounting on a frame of the snowmobile and defining a parallelogram linkage for guiding said bearing support to move generally vertically with respect to the snowmobile; and yieldable suspension spring and damper means operatively associated with each ski to urge it downwardly to support the weight of the snowmobile thereon and dampen vertical movement thereof, wherein said suspension spring and damper means has one end anchored to a fixed mounting on the frame of the snowmobile and the opposite end connected to a lever system comprising a crank lever having one arm pivoted to said opposite end, a second arm pivoted to one end of a strut and an intermediate portion pivoted on a fixed mounting on the snowmobile frame, said strut extending generally downwardly to a second end which is pivotally connected to the respective lower transverse suspension arm, and further comprising an elongate contorol arm fixedly attached to each said bearing support and extending rearwardly therefrom, said control arm having a rear end pivotally mounted on a fixed transvere horizontal axis in the snowmobile and being operative to control displacement of the bearing support in the fore-and-aft direction of the snowmobile during deflection of said ski suspension.

6. A suspension according to claim 5 wherein each ski leg has an upper end which extends about the respective bearing support and is coupled to a generally radially extending steering arm which has a distal end that is articulated to a steering rod coupled to the steering mechanism of the snowmobile.

7. A suspension according to claim 6 wherein the inboard end of each steering rod is articulated to a steering control plate which is horizontally arranged to pivot about a vertical mounting axis on the snowmobile frame.

8. A suspension according to claim 5 wherein the dimensions and the spatial arrangement of the suspension arms, the strut, the crank lever and the suspension spring and damper means is such that the resistance to compression of said suspension spring and damper means increases exponentially as the ski suspension is deflected progressively upwards from its normal position.

* * * * *